Figure 2:
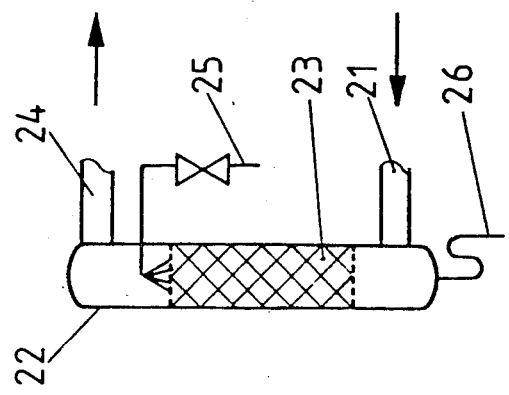

United States Patent [19]
Oeste et al.

[11] Patent Number: 4,595,575
[45] Date of Patent: Jun. 17, 1986

[54] PROCESS FOR THE CONTINUOUS PURIFICATION OF WASTE GASES WITH ACTIVATED CARBON

[75] Inventors: Franz D. Oeste, Münzenberg; Joachim R. Kempfert, Kronberg, both of Fed. Rep. of Germany

[73] Assignee: Rütgerswerke Aktiengesellschaft, Fed. Rep. of Germany

[21] Appl. No.: 717,228

[22] PCT Filed: Dec. 18, 1984

[86] PCT No.: PCT/EP84/00431
§ 371 Date: Mar. 19, 1985
§ 102(e) Date: Mar. 19, 1985

[87] PCT Pub. No.: WO85/02786
PCT Pub. Date: Jul. 4, 1985

[30] Foreign Application Priority Data
Dec. 21, 1983 [DE] Fed. Rep. of Germany ....... 3346176
Nov. 24, 1984 [DE] Fed. Rep. of Germany ....... 3442925

[51] Int. Cl.⁴ ..................... B01D 39/00; B01D 53/00; B01J 8/00
[52] U.S. Cl. .................................... 423/210; 55/181; 55/390; 422/177; 423/219; 423/230; 423/239; 423/240; 423/241; 423/244; 423/245

[58] Field of Search ................ 423/210 S, 240 S, 241, 423/230, 239, 244 R; 55/181, 390; 422/177

[56] References Cited
U.S. PATENT DOCUMENTS
4,344,920 8/1982 Isserlis ............................ 423/244 R
4,366,085 12/1982 Ikegami et al. .................. 423/210 S
4,521,390 6/1985 Mouille et al. ...................... 423/239

FOREIGN PATENT DOCUMENTS
3304976 8/1984 Fed. Rep. of Germany ...... 423/244

Primary Examiner—John Doll
Assistant Examiner—Lori S. Freeman
Attorney, Agent, or Firm—Bierman, Peroff & Muserlian

[57] ABSTRACT

The invention relates to a process for the continuous wet or wet-catalytic purification of waste gases by adsorption and chemisorption of the gaseous pollutants on activated carbons with simultaneous desorption of these pollutants or their reaction products. The process is carried out at 100 to 800 times gravity acceleration in a centrifugal filter, in the rotor of which a bed of fine-grain or fibrous activated carbon is arranged. The waste gas passes through this bed in codirectional or countercurrent flow to the wash liquid. The pollutants are washed out with the desorbent flowing from the center outwardly.

8 Claims, 2 Drawing Figures

PROCESS FOR THE CONTINUOUS PURIFICATION OF WASTE GASES WITH ACTIVATED CARBON

The invention relates to a process for the continuous purification of waste gases by chemisorption and adsorption of the gaseous pollutants to activated carbon and desorption of these pollutants or of their reaction products.

In the literature, a distinction is made between dry and wet or wet-catalytic processes for adsorptive waste gas purification. The dry processes operate above the dew point of the waste gases, but in case the adsorbent is recycled, they require either thermal desorption or, after extraction with a liquid extraction agent, drying. The wet or wet-catalytic processes, on the contrary, operate below the dew point of the waste gases, so that the usually water vapor-saturated clean gases must be heated up. This is often regarded as a disadvantage, but it can be remedied by means of a heat exchanger between hot waste gas and clean gas. The desorption of the pollutants occurs by extraction or washing of the adsorbent.

As an example of a dry process for the continuous purification of waste gases with activated carbon there may be cited the flue gas desulfurization process of Bergbau-Forschung (Mining Research) (Chemische Industrie, August 1975, pages 437 to 461). A traveling bed reactor is used as adsorber here. The laden activated carbon is mixed in the desorber with heated sand and regenerated at a temperature between 500° and 650° C. Thereby a $SO_2$-rich gas is obtained, which can be processed to sulfur or sulfuric acid. Since in the continually renewed filter bed also solids particles are being separated, an additional dust separation is not required. A disadvantage, however, is the high cost of instrumentation and energy of the regeneration plant required for the process. Besides, depending on the hardness of the activated carbon used, considerable abrasion must be expected, which must be compensated by continuous replenishment of fresh activated carbon.

As an example of a wet-catalytic process for the continuous purification of waste gases with activated carbon the Lurgi SULFACID process (Lurgi Newsletter T 1260/11.77) may be cited. The process is also used for the separation of sulfur dioxide from waste gases. Here the crude gas is passed through a fixed bed of activated carbon at a temperature of 50° to 80° C. In the presence of water and oxygen, the sulfur dioxide in the activated carbon is transformed into sulfuric acid, which is washed out periodically with water in counter-current. To obtain a uniform purification of the waste gases, only a segment of the fixed bed is sprayed with water each time. Due to the water film surrounding the activated carbon grains, the adsorption capacity of this segment is reduced. However, there is little danger of sulfur dioxide irruption, as the flow resistance is increased at the same time. To reduce the thickness of the water film and thereby to increase the rate of adsorption, the washed activated carbon is dried with the unsaturated crude gas.

It must be regarded as a disadvantage that because of the long drying time to attainment of the maximum adsorption capacity of the dry activated carbon, a height of the fixed bed is necessary which is much greater than would be necessary for adsorption to unladen activated carbon. Furthermore, the fixed bed with periodic desorption is not very suitable for dust-containing crude gases because the dust settles between the activated carbon grains and is not flushed away by the laminar flow of the water film. It is proposed, therefore, to wash the crude gases before entrance into the fixed bed with the thin acid occurring in the process and thereby to increase the concentration thereof. Thus, however, a saturated crude gas would be obtained which is unable to dry the washed fixed bed segment. As an advantage must be seen the low cost of instrumentation and energy in this process.

It is the object of the invention to develop a wet or wet-catalytic process for the continuous purification of waste gases with activated carbon which does not have the described disadvantages.

This problem is solved in that the activated carbon is arranged in the rotor of a centrifugal filter through which the waste gas passes, while at the same time the desorbent flows uniformly through the activated carbon bed from the center outwardly.

As desorbent often already the condensation of the water vapor contained in the waste gas is sufficient. Additional wash liquid can be applied uniformly on the hollow shaft, perforated in the region of the rotor, of the centrifugal filter. This is done either with nozzles or preferably by means of brushes sliding on the inside of the hollow shaft. Generally water or thin acid is used as wash liquid. As activated carbon there can be used a bed of granulated activated carbon such as extruded compacts or pellets, in particular those having a diameter of less than 1 mm. Preferred, however, are mats, felts or fabrics of activated carbon fibers which are placed in the rotor in rings or spirals.

Depending on the type of pollutants present, the catalytic activity of the activated carbon can be increased by doping with heavy metal or halogen compounds, as is customary in the chemisorption process with activated carbon.

As preliminary tests have shown, centrifugal accelerations of as little as 5 G (5 times gravity acceleration) are sufficient to considerably reduce the thickness of the liquid film. Preferably, however, one operates with a mean gravity acceleration between 100 and 800 G. At room temperature, an activated carbon mat with a fiber diameter of 8 micron, a weight per unit volume of 50 $kg/m^3$ and a specific surface of 1200 $m^2/g$ absorbs approximately 20 times the activated carbon volume of a 40% sulfuric acid. This corresponds approximately to a mean film thickness of 31 micron. At a centrifugal acceleration of 5 G this film thickness is reduced to about 11.6 micron. At 100 G there remains on the activated carbon fiber only a mean film thickness of about 8 micron, and at 800 G, one of 2 micron.

It has been found furthermore that with waste gases conducted in counter-current, dust type impurities are also removed by the flowing water film, so that clogging of the activated carbon bed need not be feared.

However, the waste gases can also be conducted in codirectional flow with the wash liquid. The pressure difference between the clean gas side and the crude gas side is thereby reduced, and the expelled wash liquid no longer contains any unreacted, dissolved pollutant gases.

As the adsorbed pollutants or their reaction products are washed out continuously, only very low bed heights are required by comparison with the known process. This fact permits the use of very fine-grain activated carbon and activated carbon fibers with very large exchange surface, without the pressure loss becoming excessive.

With the process of the invention as well as with the described known processes, not only sulfur dioxides but also such pollutants as HCl, $Cl_2$, $COCl_2$, $PH_3$, HF, $NO_x$ or $H_2S$ can be removed from waste gases. In some cases the desorbent must be selected in accordance with the respective pollutant. Thus, $H_2S$ and mercaptans are oxidized at activated carbon to sulfur and disulfides and can be extracted with organic solvents.

Although the process is perfectly suitable for purifying also waste gases having a low pollutant content, the advantages appear in particular when the pollutant load is high, which in the known process may require higher beds and/or wash cycles in rapid succession, so that the fixed bed can be dried only incompletely. It has been found, surprisingly, that the process is quite insensitive to strong fluctuations in the pollutant content of the waste gases and even a high concentration of the pollutants or their reaction products in the desorbate can be tolerated, without the quality of the clean gas being diminished.

The process of the invention will be described more specifically with reference to some examples, without being limited thereto. The tests were carried out with the apparatus illustrated in FIG. 1. It shows a centrifugal filter (1) for the waste gas in the front housing (2) of the centrifuge. In the counter-current process, the waste gas traverses the activated carbon bed (4) disposed in the rotor (3) and issues from the perforated portion (5) of the hollow shaft (6). At point (7) the hollow shaft (6) is sealed from the front housing (2). The clean gas leaves the centrifuge via an outlet (8) in the rear housing portion (9). Via a line (10) which is equipped at its end with bores and a brush element, the desorbent is applied on the perforated portion (5) of the hollow shaft. The desorbate is discharged via a siphon (11) at the bottom of the front housing (2). The rotor (3) can be driven at the desired speed through a shaft (12).

In the codirectional flow process, the waste gas passes via the perforated portion (5) of the hollow shaft (6) into the centrifuge. The clean gas leaves the latter via the opening (1). The centrifuge may be provided additionally with inserts, e.g. baffles, inside and/or outside the rotor, to reduce the pressure loss of the gas flow and to even out the distribution of the gas over the circumference of the rotor.

The comparison tests were carried out in the apparatus illustrated in FIG. 2. The waste gas enters the absorption column (22) via line (21) and flows through the activated carbon bed (23). The clean gas leaves the adsorption column (22) via line (24). The desorbent is sprayed onto the activated carbon bed (23) through line (25). The desorbate is discharged via the siphon (26).

EXAMPLE 1

Figure 1:
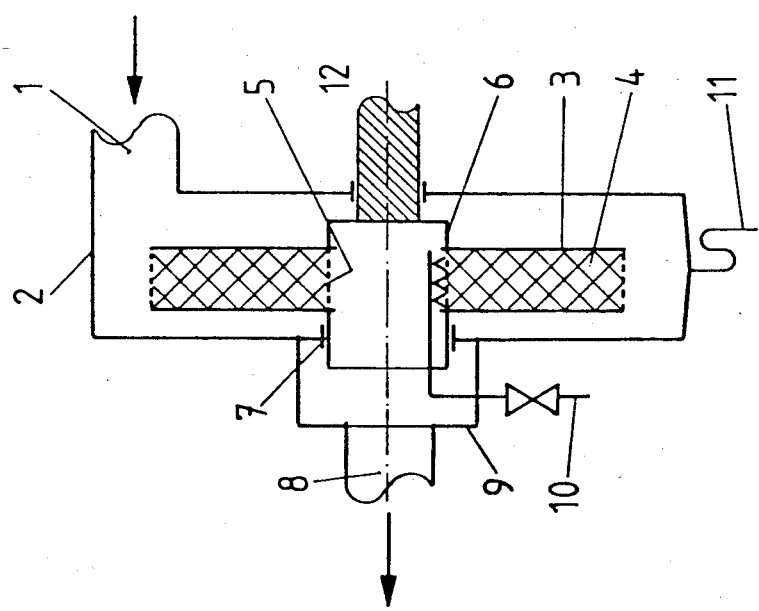

As reactor is used the apparatus illustrated in FIG. 1 having an activated carbon ged of coal-based cylindrical activated carbon bodies (cylinder diameter 4 mm, bulk weight 320 kg/m$^3$, specific surface 1200 m$^2$/g). The bed height in flow direction is 20 cm. The rotor speed is adjusted so that in the center of the bed height a centrifugal acceleration of 200 G (G=gravity acceleration) exists. The waste gas ($SO_2$=2 g/m$^3$; $H_2O$=190 g/m$^3$; air) is introduced into the apparatus via the inlet opening (1) at 80° C. The gas velocity at the center of the bed height is 0.1 m/s referred to the free cross section. The activated carbon is washed with water as desorbent at 80° C. in counter-current. Referred to the mean free cross section of the activated carbon bed, 2.7 kg/m$^2$h desorbent are needed. A residue of 0.4 g/m$^3$ $SO_2$ is measured in the clean gas. This represents a purification effect of 80%. As desorbate a 25% sulfuric acid is obtained.

EXAMPLE 2

As reactor is used the apparatus illustrated in FIG. 1 having an activated carbon bed which consists of several stacked annular windings of a viscose-based activated carbon mat (fiber diameter 8 micron, weight per unit volume 50 kg/m$^3$, specific surface 1200 m$^2$/g). The bed height is 10 cm. The centrifugal acceleration and the gas velocity are as in Example 1.

The waste gas ($PH_3$=0.5 g/m$^3$, $O_2$=7 g/m$^3$, $H_2O$ 17 g/m$^3$, nitrogen) is introduced into the apparatus in counter-current to the wash liquid at 20° C. In counter-current the activated carbon bed is washed with 1.32 kg/m$^2$h (referred to the mean free cross section) of a 10% phosphoric acid at 20° C. For the entire test duration of 30 hours the clean gas is free from phosphine. The desorbate contains about 30 percent by weight phosphoric acid. The pressure difference between crude gas inlet and clean gas outlet is 120 mm water column.

EXAMPLE 3

Under the same conditions as in Example 1, a waste gas (HCl=15 g/m$^3$, $H_2O$=190 g/m$^3$, air) is adsorbed at an activated carbon bed of pitch-based spheroids (diameter 0.7 mm, specific surface 1200 m$^2$/g) and desorbed with 26.4 kg/m$^2$h water (referred to the free mean cross section). Even after several hours of operation, no HCl can be measured in the clean gas. The desorbate contains 17 wt.% hydrochloric acid.

EXAMPLE 4

Under conditions similar to those in Example 2, waste gas ($Cl_2$=0.5 g/m$^3$, $COCl_2$=0.5 g/m$^3$, $H_2O$ 17 g/m$^3$, nitrogen) is chemosorbed at an activated carbon fiber mat bed 20 cm high. As desorbent are used 79 kg/m$^2$h water (referred to the free mean cross section). The centrifugal acceleration is 300 G. During the 20-hour test duration, no measurable irruptions of chlorine, hydrochloric acid or phosgene are detectable on the clean gas side. The desorbate contains between 0.4 and 0.5 wt.% hydrochloric acid.

EXAMPLE 5

Example 1 is repeated with an activated carbon fiber bed as in Example 4 at a centrifugal acceleration of 600 G without additional application of water. The water vapor condensed from the waste gas acts as desorbent. Even after 8-hour operation of the installation, the clean gas contains no measurable $SO_2$. The desorbate has a sulfuric acid content of 30 wt.%.

EXAMPLE 6

Example 2 is repeated, the waste gas being conducted in codirectional flow with the wash liquid. The clean gas is again free from phosphine, and also in the wash liquid no phosphine can be detected. The pressure difference between crude gas inlet and clean gas outlet is only 60 mm water column, in contrast to that in Example 2.

EXAMPLE 7

Example 5 is repeated with an activated carbon mat 1 cm thick at a centrifugal acceleration of 600 G. With the counter-current procedure as in Example 1 as well as with the codirectional flow procedure, no $SO_2$ is detectable in the clean gas.

EXAMPLE 8 (COMPARISON)

Example 1 is repeated in the comparison apparatus illustrated in FIG. 2 under otherwise identical conditions. 1.5 $g/m^3$ $SO_2$ are still measured in the clean gas. This represents a purification effect of only 25%. The desorbate contains only 8 wt.% sulfuric acid.

EXAMPLE 9 (COMPARISON)

Example 2 is repeated in the comparison apparatus illustrated in FIG. 2 under otherwise identical conditions. The test must be stopped after a short time because the wash water cannot traverse the activated carbon bed without interruption of the waste gas stream.

EXAMPLE 10 (COMPARISON)

Example 3 is repeated in the comparison apparatus illustrated in FIG. 2 under otherwise identical conditions. This experiment, too, must be stopped because the wash water cannot traverse the activated carbon bed without interruption of the waste gas stream.

EXAMPLE 11 (COMPARISON)

Example 5 is repeated in the comparison apparatus illustrated in FIG. 2 under otherwise identical conditions. No desorbate is obtained. After a test duration of about 4 h a sulfur dioxide irruption appears. As the test continues, the sulfur dioxide concentration in the clean gas rises continuously.

As the examples show, it is possible to substantially increase the adsorption or chemosorption of pollutants from waste gases at activated carbon under the action of a centrifugal acceleration of a multiple of gravity acceleration with simultaneous desorption. In the case of very dense activated carbon beds, it is only under these conditions that the simultaneous desorption becomes possible at all. Furthermore it is evident from the examples that at equal bed height considerably longer adsorption or chemisorption times can be realized, due to more intensive desorption. In contrast to the prior art processes, an equilibrium adjusts itself already after a short time in the entire bed and does not change any more, so that there is no danger of pollutant irruption even in long-term operation.

We claim:

1. A process for the continuous wet or wet-catalytic purification of waste gases by chemisorption adsorption of gaseous pollutants on activated carbon and desorption of these pollutants or their reaction products, characterized in that activated carbon is arranged in a rotor of a sieve-centrifugal filter and the waste gas passes through the activated carbon and issues via a perforated portion of a hollow shaft, while at the same time the desorbent flows through the activated carbon bed from the center outwardly.

2. Process according to claim 1, characterized in that for desorption a wash liquid is applied uniformly on the hollow shaft of the centrifugal filter perforated in the region of the rotor.

3. Process according to claim 2, characterized in that the wash liquid is applied by means of brushes sliding on the inside of the hollow shaft.

4. Process according to claim 1, characterized in that mats, felts and fabrics of activated carbon fibers are used as activated carbon.

5. Process according to claim 1, characterized in that granulated carbons having a mean diameter of less than 1 mm are used as activated carbon.

6. Process according to claim 1, characterized in that the rotor of the centrifugal filter rotates at a speed such that in the center of the activated carbon bed a centrifugal acceleration results which corresponds to 100 to 800 times gravity acceleration.

7. Process according to claim 1, characterized in that it is carried out in a temperature range of from 20° to 80° C.

8. Process according to claim 1, characterized in that the centrifuge is provided with baffles inside and/or outside the rotor.

* * * * *